Sept. 14, 1943.     E. J. HEFELE     2,329,199
RIGHT-LEFT INDICATING DIRECTION FINDER SYSTEM
Filed Oct. 2, 1935     4 Sheets-Sheet 1
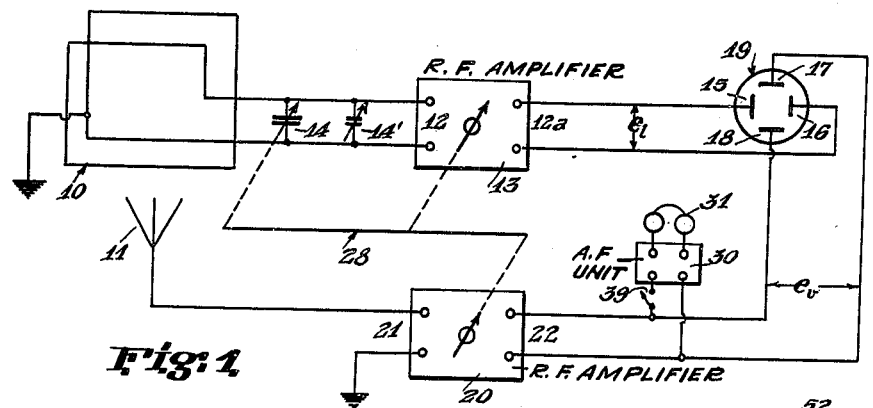
Fig. 1
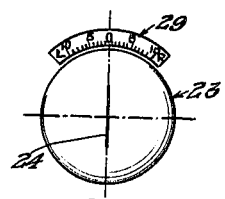
Fig. 2-a
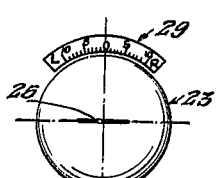
Fig. 2-b
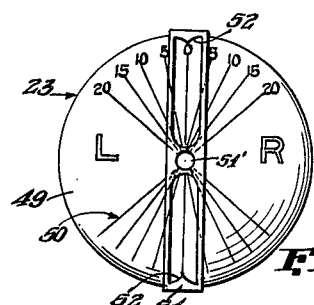
Fig. 4
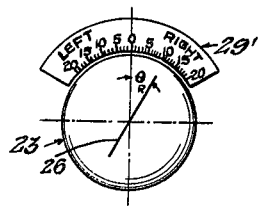
Fig. 3-a
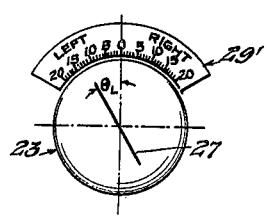
Fig. 3-b
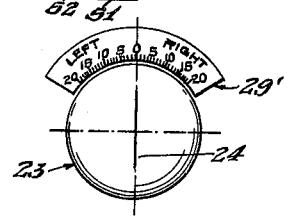
Fig. 3-c
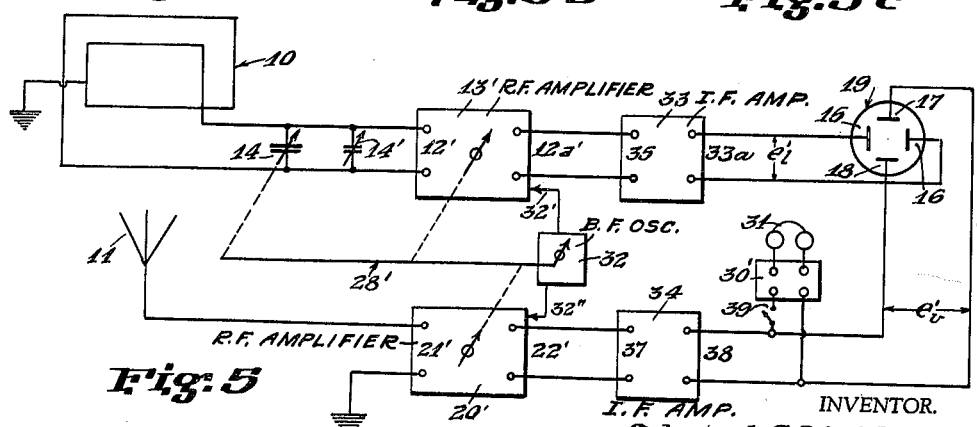
Fig. 5
INVENTOR.
Edward J. Hefele
BY
Samuel Ostrolenk
ATTORNEY.

INVENTOR.
Edward J. Hefele
BY
Samuel Ostrolenk
ATTORNEY.

Sept. 14, 1943.  E. J. HEFELE  2,329,199
RIGHT-LEFT INDICATING DIRECTION FINDER SYSTEM
Filed Oct. 2, 1935  4 Sheets-Sheet 3

INVENTOR.
Edward J. Hefele
BY Samuel Ostrolenk
ATTORNEY.

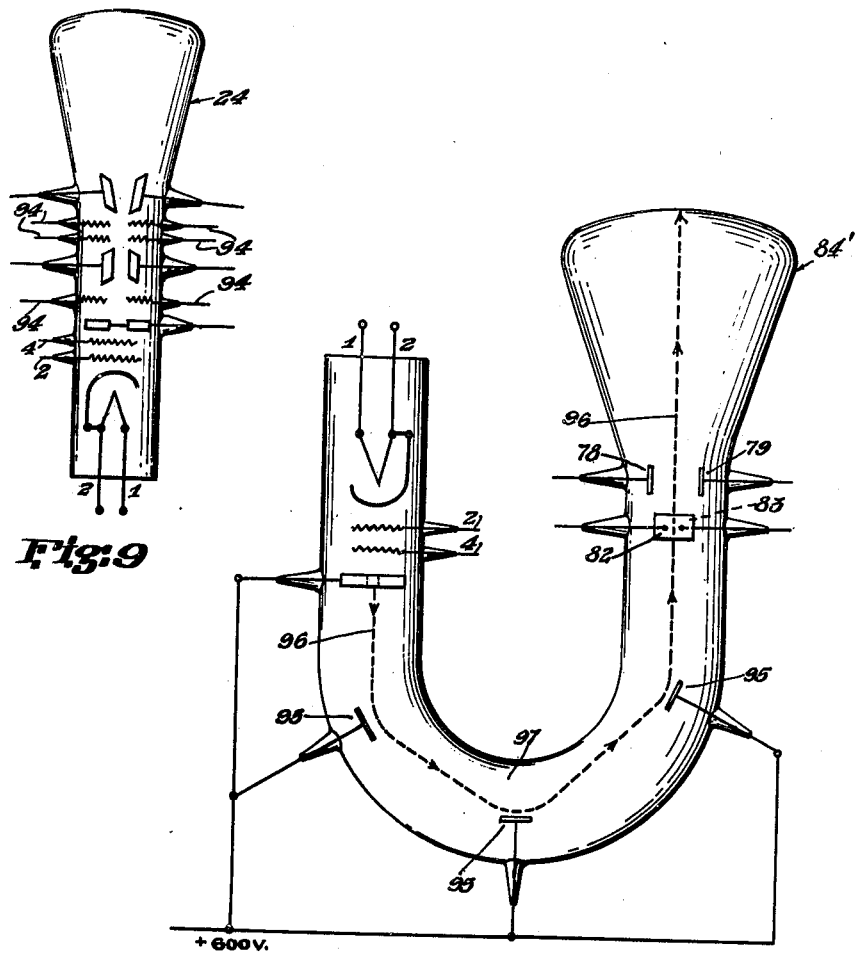

Patented Sept. 14, 1943

2,329,199

UNITED STATES PATENT OFFICE 2,329,199

RIGHT-LEFT INDICATING DIRECTION FINDER SYSTEM

Edward J. Hefele, Amityville, N. Y.

Application October 2, 1935, Serial No. 43,189

9 Claims. (Cl. 250—11)

My invention relates to radio direction finders, and more particularly, to that type of direction finder that automatically indicates the deviation in bearing to the right or left of the desired direction.

The determining factor in the directional function of the usual direction finder with a loop antenna is the orientation or angular position of the loop with respect to the direction of the received signal. The null point is detected by a sharp demarcation between a decreasing and increasing signal reception according to the angular position of the loop. Accurately controlled frequency, amplification or other electrical conditions in the associated apparatus are unnecessary since they do not affect the accuracy of the indicated direction. Thus the directional accuracy of loop reception depends solely upon the geometry of the loop, i. e., the angular position of the loop and is unaffected by variations of the electrical constants.

In numerous situations, such as in aeroplanes, however, direction finders are insufficient due to the experimental work necessary in rotating the loop back and forth to find the null or maximum. For these cases, it has been proposed to use a right left indicator, a system in which bearings are obtained automatically.

In right left indicators proposed heretofore, however, the readings depended upon constancy of the electrical conditions of the circuit, a factor which is impossible to obtain, and accordingly no commercially practical right left indicator system has heretofore been developed.

An early attempt at imparting a right and left sense to the direction finder was to utilize two loop antennae placed at an angle to each other (usually 90°), two radio receivers, and a differentially connected indicating meter. The normal figure-of-eight polar pattern defined the reception of each loop and associated amplifier independently. When the loops were in "on-course" position, equal signals are received by them and therefore equal outputs would be fed to the differentially connected output meter. This meter was connected so that the equal outputs produced equal and opposite deflecting torques upon the indicating needles, which resulted in a zero center or "on-course" reading. If the line of bearing was to either the right or left of the true radio bearing, one of the loop signals predominated and the receivers thus had unequal inputs applied to them from the loop antennae. There resulted unequal outputs to the indicating meter, producing a resulting indication which was either to the right or to the left of the zero center.

There are several disadvantages inherent in this system. There are four directional indications obtainable for each resultant signal strength throughout the range of 360° azimuth with respect to the transmitting source, resulting in a 90° bearing ambiguity. Moreover, there are many electrical constants which require corrections. Thus the over-all amplification or gain of the two radio receivers must be equal and so maintained. This can be accomplished for short intervals of times and to maintain this equal gain requires repeated adjustments of the equipment. The design of the equipment must be such that the two loop antennae have equal effective heights, equal inductance and tune to exactly the same signal frequency, necessitating a degree of precision in manufacture which make such a direction finder a very expensive precision instrument and commercially impractical. A slight misadjustment in either loop circuit results in errors of as much as six or seven degrees. Tests have shown that such equipment is entirely unreliable under normal operating conditions on the ground, on shipboard or in an aircraft.

The next development in the art was to remove a major disadvantage by utilizing only one radio receiver. The components of this system also consisted of two loop antennae placed at an angle with respect to each other, a single radio receiver, a differentially connected indicating meter, and a switching device which alternately connected either loop to the radio receiver and at the same time switched the corresponding terminals of the indicating meter to the output of the radio receiver. The necessity of maintaining the sensitivity of two radio receivers equal, was thus entirely removed. Various switching schemes were tried but it was found that mechanical switching introduced transient voltages to the radio receiver which resulted in erratic operation. Electronic switching was then developed to avoid the objectionable transients. However, bearing inaccuracies resulting from slight misadjustments in either loop circuit together with the 90° bearing ambiguity, make such right left indicator systems impractical, especially for aircraft use.

The more recent developments depart from the two loop principle and utilize but a single loop. They consist essentially of a loop antenna, a small vertical antenna, an electronic switching mechanism, a radio receiver and a differentially indicating meter. The loop antenna and the vertical antenna are alternately connected to produce a cardioid polar pattern of reception first having the null direction towards the right and then towards the left of the direction of motion. The switching mechanism is arranged to alternately apply such right and left hand cardioid reception patterns to the radio receiver. An "on-course" bearing produces equal signal inputs to the receiver, so that there is a resultant zero torque on the needle of the differentially connected indicating meter. This scheme is a great improvement over previous types of right and left indicating direction finders. A much greater percentage of the effective height of the loop antenna is utilized, resulting in a higher signal to static noise ratio which permits bearings to be taken when the null type direction finder would not be usable. 180° bearing ambiguity is eliminated since when the aircraft is receding from instead of approaching the radio transmitter, the right-left sense indication becomes reversed. Only one loop antenna is employed, reducing the loop system aero-dynamic resistance by approximately fifty per cent. Several serious disadvantages nevertheless make this direction finder extremely unreliable. Where it is the sole navigational instrument, as is often the case when an aircraft is flying through fog, this unreliability is dangerous because of the fact that the indicating meter will continue to indicate right and left even though the bearing may be in serious error, with no way for the operator to test for or realize the error.

In the practical application of this apparatus, adjustments must be made very often even with the most carefully designed equipment. A tuned loop circuit and an aperiodic vertical antenna circuit with resistance phasing is generally used to produce the required cardioid polar reception patterns since this combination is most satisfactory from the standpoint of sensitivity with the use of the present radio receivers. This most advantageous antenna combination is the source of these serious errors mentioned for the following reasons. In order to produce the required cardioids, it is necessary to have properly phased loop and vertical antenna circuits. In operation, the loop must be exactly in resonance with the signal frequency and be exactly in tune with an extremely selective receiver. An extreme degree of frequency stability is thus required in the receiver, and it must therefore not be affected by temperature changes, supply voltage changes, and other conditions that alter the receiver calibration. Temperature control of the radio receiver has been tried. However, it should be noted that the loop is mounted in the open air, which in itself removes any advantages due to receiver temperature control. This is particularly true in aircraft where changes as great as 2° F. per minute may occur, which act to change the electrical tuning characteristics of the loop.

From the above it will be noted that in all the prior right and left indicators, whether two loops, a loop and a vertical antenna, or a single loop is used, the operation depends upon a comparison of the relative signal pick-up of one loop and the pick-up of either another loop or vertical antenna. A comparison of signal strengths, either arithmetically or by ratio, depends upon the absolute values of the resultant signal intensities. These intensities in turn are dependent upon electrical circuit conditions such as signal pick-up of the loop, the tuning of the loop circuit, the gain of the amplifier, etc. Since these electrical conditions are continually varying in any practical application, all right and left indicators of the prior art have been imperfect and are not reliable.

Summarizing, the single loop direction finder is reasonably accurate because it depends solely upon the geometric, in this case, angular position of the loop. The right-left indicators heretofore known, on the other hand, are inaccurate because they depend not only upon the angular position of a loop but also upon uncontrollable critical electrical parameters. These critical electrical variables may be adjusted accurately at a single frequency and for a given set of temperature humidity and electrical conditions, but when these critical adjustments change because of variations of the original conditions, large errors in directional accuracy result. What is more serious, the operator is not apprised that these changes in the electrical constants have occurred so that he may make adjustments.

In the Kruesi system, for example, Patent No. 1,868,945, if the loop is mistuned by as little as one per cent, a three or four degree material error results since the indication obtained depends upon a comparison of the signal pick-up of the loop with the signal pick-up of the vertical antenna. A two per cent mistuning error, which is a very likely practical tuning variation, will produce an indicated deviation from normal to such an extent that although the ship may be on its proper course, there will be indicated a wide off-course direction. In this, as in the other cardioid systems employing a loop, misphasing or mistuning of the loop produces an imperfect cardioid leading to erroneous indications, and there is no way for the operator to detect this condition.

In general, my invention contemplates a right left directional system in which signals from a non-directional antenna and loop antenna are impressed across the vertical and horizontal deflecting plates respectively of a cathode ray tube. I am aware that cathode-ray oscillographs have been utilized as indicators in several types of direction finders. For example, two perpendicular loop antennae receive signals which are amplified by two corresponding amplifiers and are applied to the two correspondingly perpendicular pairs of deflecting plates of a cathode-ray tube. The angular position of the resultant straight line image on the fluorescent screen corresponds to the angular position of the loop antennae with respect to the direction of the received signal. However, here the indication depends solely upon the reception and maintenance of a proper ratio of signal voltages as intercepted by two antennae and the practical inaccuracies of unbalanced loops, mistuning, unequal amplification, etc., result in false bearings. Another application is that of Bailey Patent No. 1,839,290 where two perpendicular loops and a co-axial vertical antenna present three independent signals to three interdependent amplification and rectification systems, to actuate the two pairs of deflecting plates of the cathode ray tube. Here too, vagaries of tuning and unbalanced amplification result in false indications.

Since the applied signals are of the same frequency, a stationary geometric image will result upon the fluorescent screen of the oscillograph, as hereinafter described in detail. When the signals are in phase or in opposite phase relation, a straight line image results. In case misphasing of the signal components occurs, this is immediately indicated since the straight line image then becomes an ellipse. I provide means to adjust the phase relations of the two signal components. When the loop is in the null or on-course position, no horizontal deflection component is imparted to the image and this condition is revealed by a vertical line image. A horizontal component of a magnitude dependent upon the angular position of the loop with respect to the direction of the signal transmitter, combines with the non-directional or relatively fixed vertical component to produce a straight line image at an angle to the vertical. The inclination of the image to vertical is to the right or left according to the deviation of the ship bearing from the on-course direction. Automatic right and left directional indication is thus provided with immediate detection and correction of misphasing and independent of any maintenance of the ratio of the signal voltages impressed on the two antennae. The full effective height of the antenna system is used. No bearing ambiguity exists since a reversed right and left sense occurs for a reciprocal bearing as hereinafter explained.

To reduce the aero-dynamic resistance of the loop antenna, my invention provides a streamlined loop antenna system for particular application to aircraft.

Accordingly, an object of my invention is to provide a novel right and left indicating radio direction finder.

Another object of my invention is to provide a novel right and left indicating radio direction finder that has no bearing ambiguity.

A further object of my invention is to provide a novel right and left indicating radio direction finder that is independent of misphasing of the loop signal and a novel method for detecting and correcting this condition.

A still further object of my invention is to provide a novel right and left indicating radio direction finder that functions independently of the maintenance of any ratio of voltages of the received signal in the apparatus.

Another object of my invention is to provide a novel right and left indicating radio direction finder that is independent of any variations in the electrical circuit characteristics of the system.

Still another object of my invention is to provide a novel right and left indicating radio direction finder that is simple to operate, reliable and foolproof.

Still a further object of my invention is to provide a novel loop antenna system.

A further object of my invention is to provide a novel loop antenna system with a streamlined body to present a minimum aero-dynamic resistance.

There are other objects of my invention, which together with the foregoing, will appear in the detailed description which is to follow in connection with the drawing, in which:

Figure 1 is a schematic circuit diagram illustrating one modification of my invention.

Figures 2a and 2b are certain indicator images that occur in the operation of my invention.

Figures 3a, 3b and 3c are normal views of the indicator.

Figure 4 shows a preferred embodiment of the indicator screen.

Figure 5 is a schematic circuit diagram illustrating another modification of my invention.

Figure 9 illustrates a novel cathode ray tube using shield screens between the deflecting plates.

Figure 10 shows another novel cathode ray tube bent around to reduce its overall length.

Figure 7:
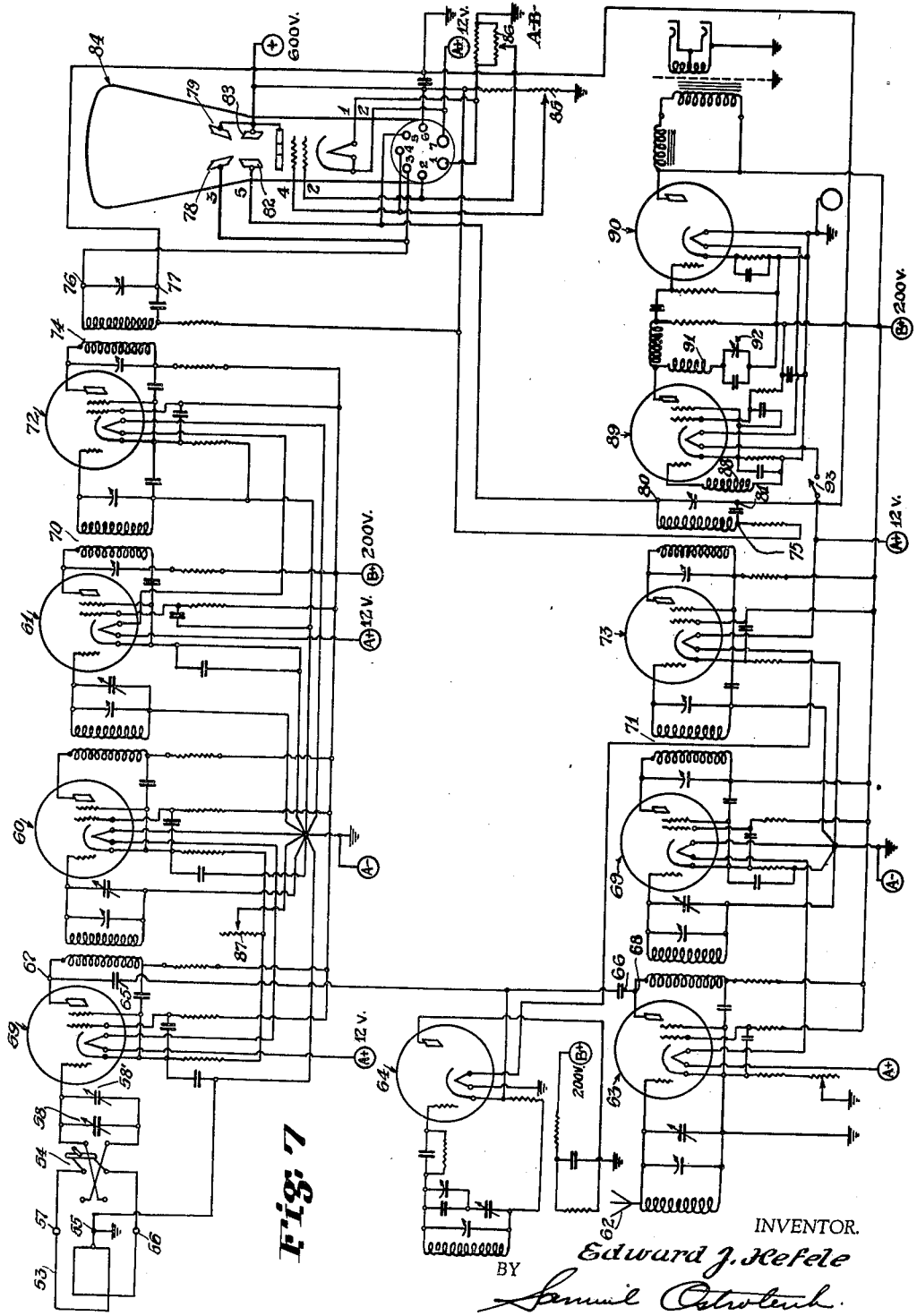
Figure 7 is a preferred circuit diagram for a complete right and left indicating direction finding system according to my invention.

In carrying out my invention, I employ a symmetrically balanced loop antenna 10 (Fig. 1) which is tuned to the signal frequency by means of the shunt variable condenser 14, and is connected to the input 12 of a tuned radio frequency amplifier train 13. The output 12a of the loop amplifier 13 is connected to the horizontal deflecting plates 15 and 16 of a cathode-ray oscillograph tube 19. A second antenna 11, which has non-directional reception characteristics, such as a vertical mast, is connected to the input 21 of a second tuned radio frequency amplifier train 20. The output 22 of the fixed antenna amplifier 20 is connected to the vertical deflecting plates 17 and 18 of the cathode ray tube 19. It is feasible and desirable to use a common tuning control, indicated schematically by 28, for the amplifiers 13 and 20 and for the loop tuning condenser 14. It is not necessary in my invention to have these tuning components tune exactly to the frequency of the signal, but it is sufficient to employ the commercial tolerances in frequency tuning where practical tuning means and alignment are utilized. Any loop antenna designed to give a normal figure-of-eight polar reception pattern is satisfactory for the operation of the present invention.

A radio frequency signal will induce a voltage in the non-directional antenna 11, which voltage is amplified by the amplifier 20 to provide a voltage in output 22 designed to be of such value as to produce a vertical line image on the fluorescent screen of the cathode ray tube 19 of a reasonable magnitude. Figure 2a shows such vertical image at line 24 as it appears on the screen 23 of the cathode ray oscillograph 19. The extent of this image line 24 depends upon the field strength of the received signal in the antenna 11, the effective amplification of its amplifier 20 and the deflection sensitivity of the cathode ray tube 19. Similarly, when a signal is received by the loop antenna 10, it will be amplified and produce a horizontal deflection of the cathode ray beam and form the straight line horizontal image 25 of Figure 2b if the fixed antenna receiver 20 is rendered temporarily inoperative.

In the following mathematical analysis of my invention, I shall neglect the modulation of the radio frequency carrier of the signals. As will be evident, the modulation of the carrier does not in any way affect the operation of the indications because both the horizontal and vertical components of the applied oscillograph deflection voltages originating from the same signal have identical wave forms. I do not detect any audio frequency modulation for the operation of the right and left indications, but, as shall be pointed out hereinafter, subsequent detection of audio frequency modulation is feasible without affecting the right and left indications. A separate aural reception receiver is therefore unnecessary which is a decided advantage in aircraft.

I shall therefore represent the voltage as amplified by the vertical antenna amplifier 20 and as applied to the vertical deflecting plates 17 and 18, as $e_v = E_v \sin 2\pi ft$, where $E_v$ is the maximum value assumed by the voltage $e_v$, and $\sin 2\pi ft$ represents the sinusoidal nature of the signal of carrier frequency $f$ impressed upon the vertical antenna 11. The signal picked up by the loop antenna 10 is amplified to a voltage $e_1$ applied to the horizontal deflecting plates 15 and 16 of the oscillograph 19, where $$e_1 = E_1 \times \sin(2\pi ft + A)$$

$E_1$ is the maximum value that the sinusoidal voltage $e_1$ assumes, and $A$ represents the electrical time phase difference between the similar voltages $e_1$ and $e_v$ as applied to the plates of the cathode ray tube. This phase difference $A$ depends on the degree of mistuning of the loop. It is well known in the art that if two similar voltages are applied to the two pairs of plates of a cathode-ray oscillograph, the resultant image is a straight line if these voltages are in phase or 180° out of phase. If a phase displacement exists between these voltages, the image becomes an ellipse. It is preferable to have an indication which is a straight line. I therefore provide a tuning adjustment to change the relative phase displacement of the loop 10 voltage as applied to its amplifier 13 at input 12. This tuning vernier is a variable condenser 14' connected across the loop tuning condenser 14 as shown in Figure 1. The operator merely adjusts this vernier 14' to cause the cathode-ray image to become a straight line. I may now represent $e_1$ as $E_1 \sin 2\pi ft$ since the time phase difference $A$ has been adjusted to zero when the image is a straight line.

When a signal is received by this system, the vertical antenna 11, being non-directional, causes a vertical image as 24 of Figure 2a, providing no resultant signal is received by the loop antenna 10. When the direction of the signal with respect to the angular position of the loop antenna is such as to cause a resultant voltage $e_1$ across the horizontal deflecting plates 15 and 16, the straight line image will assume an angular position with respect to the vertical or normal position as follows:

Figure 3a represents such a deflection of the image 26 to the right of the indicated normal position by an angle $\theta_R$. This angle $\theta_R$ is equal to $$\arctan \frac{e_1}{e_v} = \arctan \frac{E_1}{E_v}$$

and the resultant magnitude of the deflection is proportional to $$\sqrt{E_1^2 + E_v^2}$$

since these in-phase deflecting components are in quadrature. The quadrant of the deflection in this case towards R, is arbitrary and is designed to correspond to a bearing to the right of the desired course when the loop is maintained in the previous on-course position. A straight line image will be produced only when the voltages $e_1$ and $e_v$ are in phase or 180° out of phase. However, when the apparatus is once designed for the image 26 to deflect towards the R quadrant when $e_1$ and $e_v$ are, for example, in-phase, this image will deflect towards the left or L quadrant, as indicated by image 27 in Figure 3b having the corresponding angle of inclination $\theta_L$, when the voltages $e_1$ and $e_v$ become 180° out of phase. Just such a phase reversal occurs when the loop passes through the null or on-course position. Thus, if the direction of the signal is as indicated by the bearing of the loop, the cathode-ray indication will be a vertical line 24. When the apparent direction is to the right, the image is made to deviate towards the right or R, and similarly to L for a left indication, if the loop plane is maintained perpendicular to the bearing.

Assuming that the pilot is flying radially towards a beacon station from which he is receiving a signal, then the loop antenna, with its plane at right angles to the direction of the signal will pick up no energy. On the other hand, the vertical antenna voltage $e_v$ will be impressed upon the cathode-ray tube 19 alone, and will produce a vertical line image on the screen as in Figure 2a. If now the pilot is thrown from his course, so that the transmitting station is to the left of him, then the loop will pick up energy, the magnitude of which is a function of the angle which the loop makes with the direction of the incoming signal. The resultant between the magnitude of the vertical antenna voltage $e_v$ and the magnitude of the loop voltage $e_1$ produces an image 26 as in Figure 3a deflected to the R quadrant. The pilot then knows that he is flying on a bearing to the right of the beacon. If the pilot further deflects from his course, the magnitude of the signal picked up by the loop will increase, correspondingly increasing the horizontal component voltage $e_1$ on the cathode ray tube 19 and the resultant image deflection is then more to the right. The pilot is thus apprised that he is moving further off course and towards the right of the transmitting station. On the other hand, if he rotates his plane so that it approaches the line of direction of the received signal, the signal impressed upon the loop decreases in magnitude and the resultant image approaches the vertical. The pilot is then apprised of the fact that he is approaching the line of direction of the signal and is again on-course when the indication is a vertical line. A similar consideration is involved when he is flying off course towards the left of the transmitting station, except that the loop receives a signal 180° out of phase with that corresponding to that received when flying towards the right, and the image correspondingly deviates towards the left as line 27, Figure 3b, shows. We thus have normal or correct right and left indications when navigating towards a beacon. Such an indicator is extremely useful for "homing," i. e., flying to a destination transmitter by keeping the indicator image at "zero" or center.

In the case when the pilot is flying radially away from the transmitting station instead of approaching it, then the loop antenna, with its plane at right angles to the direction of the signal will again pick up no energy and a vertical image as 24 of Figure 2a will result. If now he is thrown to the right of the beacon, the loop antenna will pick up some energy but since the orientation of the loop is reversed or 180° from that condition hereinbefore described, the horizontal component voltage $e_1$ will be 180° out of phase with respect to that received hereinbefore when thrown to the right and the image will have an inclination to the L instead of R quadrant. The pilot will therefore assume that he is to the left of the incoming signal and therefore will turn his ship towards the right in order to turn to the on-course direction. He thus turns his ship further to the right, increasing the magnitude of the resultant signal in the loop and further increasing the deflection in the L quadrant. The pilot therefore will promptly realize that he is swerving further from instead of closer to his desired course, and is thus apprised of the fact that a reversed left and right indication is occurring, that he is flying on a reciprocal or reversed bearing and that the signal is coming from the rear rather than from the front of his ship.

The phase angle A between $e_1$ and $e_v$ may assume any value between $0 \pm 90°$. This can be seen by referring to the curves in "Radio Engineering," by Terman, page 49, Figure 23, page 52, Figure 29 and page 54, Figure 30, and can occur by merely mistuning the loop circuit. However, it should be noted that a 180° phase reversal by mistuning is impossible because as seen from these curves, the phase angle corresponding to A which is equal to $$\frac{2\pi fL}{R}$$

can never even reach 90°. The small vernier tuning adjustment 14' in the loop circuit provides means for properly phasing the loop voltage $e_1$ with respect to the antenna voltage $e_v$ to the proper 0° or 180° phase relation. Since mistuning cannot produce a 180° phase reversal, the only possible condition for a straight line (when A equals 0) is to bring the loop voltage phase to 0° or 180° to produce the proper right-left sense as designed for, and dependent only upon the orientation of the loop in the field of the signal. Thus, when the cathode ray screen pattern is a straight line, the phasing has been properly adjusted irrespective of any previous conditions of mistuning. The component radio frequency stages of the amplifiers 13 and 20 produce a 180° reversal in phase of the voltage as the signal passes through each stage. This condition is taken care of by properly polarizing the loop antenna 10 with respect to the amplifier outputs to give normal or correct right and left indications on the oscillograph and when once so designed will not change.

The practical functioning of my invention is independent of any exact frequency tuning of the amplifiers 13 and 20 or of the loop antenna 10 by the common tuning control 28. Temperature variations of the loop antenna, as much as 2° F. per minute as may occur in an aircraft flight, will change the loop inductance and cause mistuning of the loop. However, any mistuning, hence misphasing of the component signal voltages $e_1$ and $e_v$ produces an elliptic pattern on the screen 23 of the oscillograph 9 instead of a straight line image as is well known in the art. The pilot is thus immediately apprised of this mistuned condition, and adjusts the vernier control 14' to make the image on the screen 23 a straight line. When the pattern is a straight line, the phasing is correct, i. e., $e_v$ and $e_1$ are in phase or 180° out of phase. Hence when a vertical straight line indication appears upon the screen 23, the indicated bearing is accurate and independent of any mistuning or misphasing in the apparatus. Any variation in the over-all amplification of the signals due to practical changes of supply voltage or of other electrical parameters of the apparatus will merely change the height of the vertical line image 24 (Figure 2a) for any given input signal strength. The on-bearing indication of the vertical line image is always accurate as an indication, and its amplitude may be adjusted by a suitable receiver volume control.

A signal received by the loop antenna 10 occurs when the transmitter is to the right or left of the bearing as indicated by the zero angular position of the loop. This signal is amplified and becomes the voltage $e_1$ which is the horizontal oscillograph deflection component. The magnitude of $e_1$ depends not only upon the relative signal pick-up of the loop, but also upon its associated amplifier 13.

The directional sensitivity of the indicator is greater when the deviation from vertical $\theta_R$ or $\theta_L$ of the straight line image 26 or 27 is greater, for a given number of degrees off-course.

The indicator angle $\theta_R$ or $\theta_L$ of the deviation equals $$\arctan \frac{e_1}{e_v}$$

and therefore is dependent upon the ratio of the amplified loop antenna 10 signal $e_1$ to the amplified vertical antenna signal $e_v$. For a given vertical component $e_v$, increasing indicator deflections $\theta_R$ or $\theta_L$ are obtained for correspondingly increasing value of $e_1$. For increased indicator directional sensitivity, therefore, the amplified voltage $e_1$ corresponding to a given angular deviation of the loop from the signal direction is made correspondingly greater.

For given deflecting voltages $e_1$ and $e_v$, the maximum deflectional sensitivity of the oscillograph occurs when the accelerating voltage applied to the accelerating electrode is a minimum consistent with a reasonable pattern brilliancy. These considerations are useful for the optimum design of the apparatus.

The pilot will know when his course is as indicated by the bearings of the loop antenna 10 since its plane is at that time perpendicular to the direction of the received signals, and a vertical line image is accordingly indicated. When he is directed towards the right or left of the signal source, the null reception point of the loop is passed through and the signal which the loop receives causes a corresponding right or left deviation of the indicator image. The pilot then adjusts the vernier 14' for a straight line image if misphasing is indicated. He has positive indication that his apparatus is functioning properly, because no deflected image is possible without both a vertical and horizontal voltage component $e_1$ and $e_v$.

Should the vertical antenna 11, its amplifier 20 or the vertical deflecting plates 17 and 18 become operatively defective, the operator immediately becomes aware of this, because only a horizontal line image (similar to 25 of Figure 2b) is indicated, of varying length dependent upon the position of the loop. Should the loop antenna, its amplifier 13, or the horizontal deflecting plates 15 and 16 become operatively defective, only a vertical line image (as 24 of Figure 2a) occurs, irrespective of the angular position of the loop 10. When no signal is being received, or when both antenna systems become operatively defective, only a spot of light will appear in the center of the cathode ray screen and the operator would not then have a false bearing indication as some "null" systems would.

There is associated with the screen 23 a scale 29 having a zero center and the letter R indicating deflections to the right, and the letter L for the left. There is shown in Figs. 3a, 3b and 3c another scale 29' containing zero center, "Right," "Left," and division markings to correspond to degrees off bow. Figure 4 illustrates a preferred arrangement to facilitate reading of the indicator. Radial lines are printed or etched upon the glass front surface 49 of the cathode ray tube 23. A rectangular form 51 is affixed vertically and centrally over the zero or "on-course" line. It contains a narrow opening to permit the operator to concentrate upon a small central band of cathode ray indications therethrough. This central portion is the most important band used by the pilot, and rapid observation of this region is thus had. Pointers 52 at the zero line are provided. The radial lines 50 may be numbered to correspond to degrees to R or L off bow. A hole 51' in the center is for observation of the central spot.

The equipment may be calibrated to read actual degrees off bow as follows: Automatic volume control, as is well known in the radio receiver art, is connected to operate the gain of both the loop amplifier and the non-directional amplifier. This A. V. C. is controlled by the non-directional receiver alone, and functions to maintain a predetermined ratio of signals. A manual gain control is connected into the loop amplifier in any desired known manner. Since the angle of deflection of the image on the screen depends on the ratio of the amplification of the two amplifiers, as hereinbefore described, one may proceed to calibrate the deflections to read actual degrees in the following manner: The aircraft is directed "on course" towards a chosen transmitting station as indicated by the apparatus. By means of the usual navigational instruments, such as a compass, the pilot then directs the aircraft away from this direction by a definite amount, for example, 15 degrees to the right. A deflection to the right will be indicated on the cathode ray tube screen. By operating the manual gain control provided on the loop amplifier this deflection may be changed until it coincides with the 15 degree marking on the scale. The apparatus is thus correctly indicating, and the A. V. C. will maintain this calibration under these operating conditions for this and other beacons.

There are other visual indications on the screen that apprise the operator when false bearing indications are being received, or of other conditions of reception.

If a different signal is received by each antenna, the wave form of the voltages $e_1$ and $e_v$ applied to the plates of the oscillograph will also be different, and moving or complex geometric patterns will appear on the screen when off-course. The operator then realizes that the corresponding on-course bearing is false. Non-periodic disturbances, such as heavy static, will merely appear as spots of light of very short duration about the screen area 23 and will in no way interfere with a bearing indicating line image. Intermittent signals, key signals, or modulated continuous wave signals do not cause a change in deflection but merely a change in amplitude of the bearing indicating line image. It is also possible to read code signals directly from the cathode tube regardless of any interference and other carrier frequencies cannot affect code reception. When no signal is received, a spot of light occurs on the screen 23.

A great advantage of my invention particularly for aircraft use, is that uninterrupted aural or visual reception is possible with the apparatus.

My right and left indicating direction finder operates a cathode ray tube 19 as an indicator. This tube requires negligible signal power for the operation of its deflecting plates. No energy is therefore absorbed by the indicator 19 from the outputs 12a and 22 of the amplifiers 13 and 20. I therefore connect audio unit 30, which is a detector, and, if desirable, may include an audio-amplifier across the output 22 of the fixed antenna 11, amplifier 20. The phone receivers 31 are connected to the output of the audio unit 30. A switch 39 serves to connect the audio unit 30 to the apparatus shown in Figure 1.

A modification of my invention makes use of superheterodyne reception and is illustrated in Figure 5. The balanced loop antenna 10 with its tuning condensers 14 and 14' are connected to the input 12' of the radio frequency amplifier 13'. The output $12_a'$ is connected to the input 35 of the intermediate frequency amplifier 33 of the superheterodyne receiver. A signal from the beat frequency oscillator 32 is introduced to 13', as indicated by the arrow 32' in Figure 5. The output $33_a$ is applied to the horizontal deflecting plates 15 and 16 of the oscillograph 19 as heretofore, with the voltage indicated as $e_1'$. The fixed antenna 11 is similarly connected to the input 21' of the radio frequency amplifier 20' which output 22' is connected to the input 37 of the associated intermediate frequency amplifier 34 of the superheterodyne receiver for antenna 11. The output 38 voltage $e_v'$ is applied to the vertical deflecting plates 17 and 18 of the oscillograph 19. The common beat frequency oscillator 32 is coupled to both superheterodyne receivers in order to produce intermediate frequency voltages $e_1'$ and $e_v'$ of identical frequency. This is necessary in order to produce a fixed image upon the screen of the cathode ray oscillograph, as is well known in the art. The tuning of the beat frequency oscillator 32 is controlled by the common tuning control 28' which tunes the radio frequency amplifier 13' and 20', and the loop tuning condenser 14. The reception unit 30' is shown connected to the output of the fixed antenna intermediate frequency amplifier 34, through its switch 39.

The principle of operation of this modification is similar to those discussed heretofore in connection with Figure 1. With superheterodyne reception, however, more stable and greater amplification is practicable than with tuned radio frequency reception. In this case, one frequency, the intermediate frequency, is applied to the oscillograph 19 irrespective of the signal frequency and may be of the order of 50 to several hundred kilocycles. In the case of Figure 1, the actual signal frequencies are applied to oscillograph 19, which range from 200 to 1500 kilocycles and higher. With the superheterodyne receivers, each radio frequency and intermediate frequency stage successively reverses the phase of the signal passing through it by 180°. For a given apparatus that is designed for a proper right and left indicator sense, a reversal in bearing of 180° will become apparent by a reversed right and left indication sense as heretofore described. The vernier phasing control 14' operates as above, to properly phase the loop antenna received signal with respect to that received by the fixed antenna. The phase displacement of the voltages $e_1$ and $e_v$ are independent of the time phase of the beat frequency oscillator voltage, since this same voltage affects both amplifiers 33 and 34 similarly and simultaneously. The phase displacement between $e_1$ and $e_v$ is therefore maintained during the mixing step of the superheterodyne reception so that there is no inherent discrepancy between this system and the tuned radio frequency system.

Figure 6:
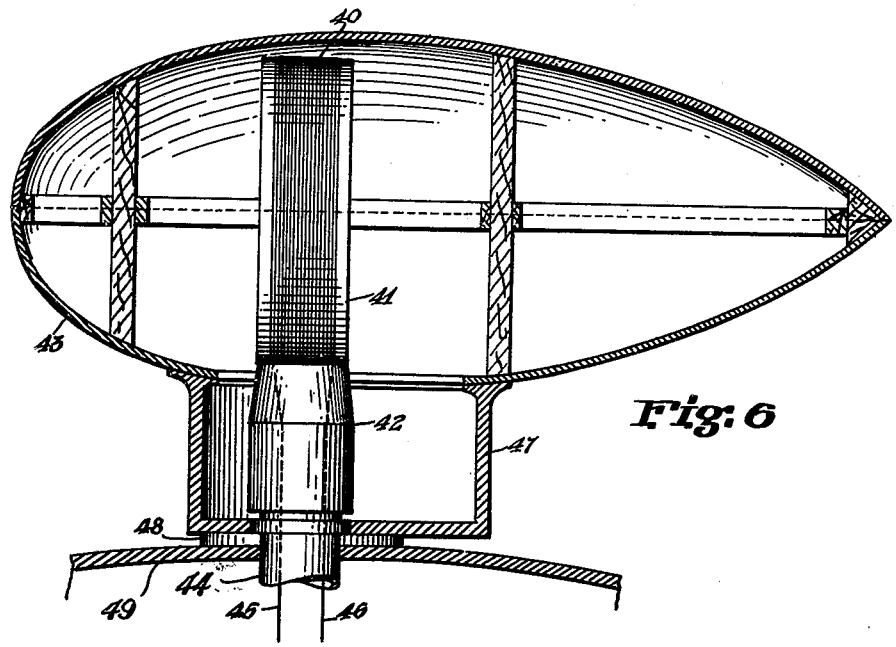
Figure 6 is a sectional view of a streamlined loop antenna.

In order to reduce the aero-dynamic resistance of the loop, I employ a streamlined loop as described in my co-pending application, Serial No. 48,300, filed November 5, 1935, which matured into Patent No. 2,062,129 on November 24, 1936. As there explained, in the majority of cases tubular metallically shielded loops have been used merely because they offer a convenient method of mechanical construction and not because of any great advantage in shielding. Figure 6 shows a loop wound with #33/38 Litz wire on a six inch diameter insulated tube 41 and mounted on a rotatable base 42 within a stream lined housing 43. The loop drive shaft 44 is connected to the loop base 42 at one end, and to the azimuth scale and hand wheel, not shown, at the other end. The end connections 45 and 46 to the loop coil 40 are brought through the loop drive shaft 44. The stream lined housing 43 is set upon the base 47 which is connected by the mounting flange 48 to the body 49 of the vehicle or aircraft upon which the apparatus is used. Housing 43 is preferably of insulating material. There is a great reduction in distributed capacity and in radio frequency resistance of this loop antenna, using no metallic shield. I have found its effective height to be fifty percent greater than an eighteen inch shielded metallic loop, and its aero-dynamic resistance is 1/25 of such a loop. The housing 43 may be readily designed to withstand even the rigors of a power dive by military aircraft. The housing 43 is rigidly mounted in position. In antenna systems where more than one loop is mounted on an aircraft, this type of stream lined housing is particularly effective in minimizing the total aero-dynamic resistance, particularly where the loops are co-axial.

Figure 7 shows a preferred diagrammatical embodiment of a complete system designed according to the principles of my invention. The loop antenna 53, which may very well be the streamlined loop hereinbefore described, is connected to the approach-recede switch 54. The center tap 55 of the loop 53 is connected to ground for symmetrical electrical balancing. The terminals 56 and 57 are connected to the center posts of the double-pole double-throw switch 54. This switch 54 serves to reverse the connections of this loop as connected across the loop tuning condenser 58. Condenser 58' is the vernier phasing control corresponding to 14' of Figures 1 and 5. The input loop signal is introduced to the first R. F. pentode amplification stage 59. A second R. F. pentode stage 60 is cascaded with stage 59 and its output is introduced to the first detector stage 61. The non-directional antenna 62 is tuned to the signal connected to the input of the R. F. amplification stage 63. A beat frequency oscillator 64 serves as the common oscillator for both amplifier trains. Various methods for coupling this oscillator to the amplifiers are feasible but I prefer, in order to minimize intercoupling, to use the coupling condensers 65 and 66, as shown in Fig. 7, connected to the corresponding points 67 and 68. The first detector stages 61 and 69 produce equal intermediate frequencies which are passed through the corresponding tuned band-pass filters 70 and 71 to the respective high-gain intermediate frequency stages 72 and 73 to the second tuned I. F. band-pass filters 74 and 75. The output 76—77 of the loop superheterodyne amplifier is connected to the horizontal deflecting plates 78 and 79 of the cathode ray tube 84. The I. F. output 80—81 of the non-directional antenna superheterodyne amplifier is connected to the vertical deflecting plates 82 and 83 of the tube 84.

A signal field strength of ½ microvolt per meter may readily be used to operate this apparatus with practical deflections. The electrodes of the cathode ray tube 84 are connected in a well-known manner. I operate the superheterodyne receivers with an anode potential of +200 volts, and the cathode ray tube with an anode potential of +600 volts. The focus control 85 and brilliancy control 86 are used to maintain a proper adjustment of the beam. The circuits of the superheterodyne stages may be conventional or connected in any suitable well known manner. The switch 54 when connected to the "approach" side will cause zero or on-course indications on the indicator when the aircraft is approaching or flying toward the radio beacon. With the switch connected to the "recede" position such indications will occur when the pilot is receding or flying from the beacon. Switch 54 is a reversing switch and is used to reverse the terminal connections of the loop to its amplifier. The pilot may thus at will cause the equipment to indicate on-course when either flying radially towards or away from the beacon. The heaters are shown connected in parallel sets of two heaters in series to utilize the standard 12-volt airplane supply with 6-volt heater tubes. An R. F. cathode biasing control 87 is employed as shown to vary the gain of the loop indicator receiver. The operator may thus control the sensitivity of the angular deflections for a particular set of flying conditions. A common automatic volume control controlled by the non-directional antenna amplifier may be used to maintain a predetermined level of amplification in both amplifiers by circuit arrangements well-known in the radio receiver art and therefore not shown in Figure 7 to avoid complication. This automatic volume control would maintain a calibrated deflectional sensitivity of the indicator after the directional sensitivity control 87 is adjusted in conjunction with a known flying deviation, as hereinbefore set forth.

An audio-receiver corresponding to 30 of Figures 1 and 5 is shown in a preferred form in Figure 7 as follows: A small coil 88 is loosely coupled to the output I. F. transformer 75 of the non-directional amplifier. Since intermediate frequency signals of the order of 150 volts are introduced at the output points 80 and 81 to the cathode ray oscillograph 84, it is essential that precautions must be taken to avoid feed back and other intercoupling troubles when using subsequent audio-detection and amplification. The I. F. signal picked up by coil 88 is introduced to the audio- or second detector stage 89 where it is demodulated and further coupled to the audio-amplifier stage 90. I have provided an inductance 91 with a capacitance 92 connected in series with it across the output of the second detector stage 89. This series circuit 91 and 92 is pre-tuned to the intermediate frequency used in the I. F. amplifier and serves as an I. F. trap to effectively by-pass any I. F. components that have reached that point to avoid spurious effects. The output of the audio-amplifier is connected in any suitable manner to telephone jacks for audio-reception. The switch 93 is used to interrupt the heater voltage supply to the audio-stages 89 and 90 when audio-reception is not desired. It is realized that since a small percentage of the available I. F. signal energy is necessary to operate this audio-receiver section, the connection of the heaters of this section by means of switch 93 will permit the operator to listen to the modulation of any received signal, without in any way affecting the right and left indications of the cathode ray tube. Design precautions must be taken to avoid feedback and intercoupling between the two amplifiers. Such precautions are well known to the art, and are necessary where two such high gain units are so closely interrelated.

Figure 8:
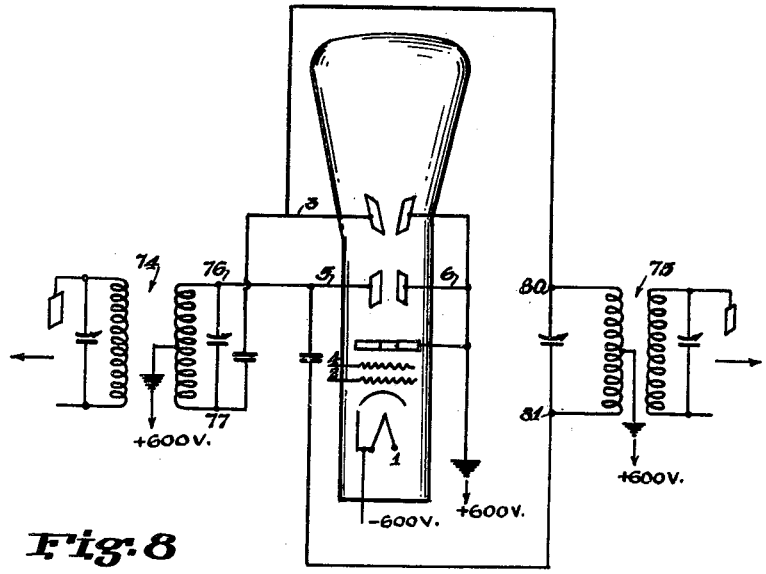
Figure 8 is a modified connection diagram for the cathode ray tube.

Figure 8 shows a circuit connecting the cathode ray tube 84 in another preferred manner, so that the high-potential electrodes and the corresponding deflecting plates are connected to ground, and the cathode is connected to −600 volts.

To decrease the capacity coupling between the horizontal and vertical deflecting plates of the cathode ray tube I provide screens 94 inserted between them as illustrated in Fig. 9. These screens may have a lattice or grid structure, and are circuitally connected in a manner similar to the ordinary screen grid of a tetrode or pentode. The D. C. electrostatic potential of these screens 94 will correspond to that of the deflecting plates but will still be at ground A. C. potential.

For airplane dashboard use, the regular construction of a cathode ray tube is inconveniently long. Figure 10 illustrates such a tube 84' bent over on itself to reduce its over-all length by half. The elements are correspondingly numbered as in Figure 8. Several deflecting plates 95 are connected to the high-potential source of the tube. These plates 95, at the same potential as the accelerating anode, will deflect the electron beam 96 in the manner illustrated, around the bent portion 97 of tube 84'. The deflecting plates 78, 79, 82 and 83 are placed beyond the last deflecting plate 95 in the final course of the beam 96 before it hits the screen.

From the above it will now be clear that I have discovered a right and left indicating direction finder which is dependent for its directional accuracy only upon the angular position of a single loop antenna with respect to the signal source and is completely independent of any accidental variations in conditions or adjustments of the circuit. All previous right and left indicating direction finders have depended upon the comparison of the relative pick-up of two antennae whereas my right and left indicating system depends for its directional indications only upon the absolute pick-up of a single loop antenna and utilizes the change-over or null reception characteristic of the loop for its indications. I provide for independent amplification of the loop and non-directional antennae signals, and introduce the outputs of the respective amplifiers, at the original or a reduced frequency, to two corresponding sets of deflecting plates of a cathode ray tube. It will be seen that the vertical and loop antennae signals are in no way interconnected or intercoupled except at the cathode ray tube. I thus avoid all the difficulties of misphasing and other unbalancing possible with previous systems where the loop and vertical antennae signals must be combined in a particular manner, e. g., to produce a cardioid reception pattern, before introduction to the amplifier. I furthermore have constant independent visual indications of the condition and relative combination of the two antennae and amplifier components, whereas in previous systems there is no way of realizing such factors.

Although in illustrating this principle, I have employed a loop and vertical antenna, two amplifiers, a cathode ray tube, and particular circuit connections, it will be understood that I am not to be limited by these examples, but only as set forth in the appended claims.

I claim:

1. In a directional system; a loop antenna for receiving signals varying in magnitude in accordance with the relation of the plane of the loop to the direction to the transmitting station; a non-directional antenna for receiving signals from the same station; an amplifier connected to said loop antenna; an amplifier connected to said non-directional antenna; a cathode ray tube having a first and second pair of deflector plates; circuit connections from the output of said loop antenna amplifier to one set of said deflector electrodes of said cathode ray tube; circuit connections from the output of said non-directional antenna amplifier to the other set of said deflector electrodes of said cathode ray tube for producing directional indications corresponding to the direction to the transmitting station and means for bringing the signals received in the radiation field through said loop and through said non-directional antenna into phase with each other at said deflecting plates of said cathode ray tube.

2. In a directional system; a loop antenna mounted on a moving vehicle and rotatable with respect to the direction to the transmitter station of the received signals as the direction of travel of the vehicle changes with respect to the direction to the transmitting station of the received signal for receiving signals in the radiation field varying in magnitude in accordance with the relation of the plane of the loop to the direction to the transmitting station; a non-directional antenna for receiving signals from the same station; an amplifier connected to said loop antenna; an amplifier connected to said non-directional antenna; a common control for said amplifiers; a cathode ray tube having a first and second pair of deflecting plates; circuit connections from the output of said loop antenna amplifier to one pair of said deflecting plates; circuit connections from the output of said non-directional antenna amplifier to the other pair of said deflecting plates for producing directional indications corresponding to the direction to the transmitting station with respect to the plane of the loop.

3. In a directional system; a loop antenna mounted on a moving vehicle and rotatable with respect to the direction to the transmitter station of the received signals as the direction of travel of the vehicle changes with respect to the direction to the transmitting station of the received signal for receiving signals in the radiation field varying in magnitude in accordance with the relation of the plane of the loop to the direction to the transmitting station; a non-directional antenna for receiving signals from the same station; an amplifier connected to said loop antenna; an amplifier connected to said non-directional antenna; a cathode ray tube having a first and second pair of deflecting plates; circuit connections from the output of said loop antenna amplifier to one pair of said deflecting plates; circuit connections from the output of said non-directional antenna amplifier to the other pair of said deflecting plates; means for translating the variations in amplitude of the received signals into directional indications on said tube of the direction to the transmitting station with respect to the plane of the loop free of directional ambiguities.

4. In a directional system; a loop antenna mounted on a moving vehicle and rotatable with respect to the direction to the transmitter station of the received signals as the direction of travel of the vehicle changes with respect to the direction to the transmitting station of the received signal for receiving signals varying in magnitude in accordance with the relation of the plane of the loop to the direction to the transmitting station; a non-directional antenna for receiving signals from the same station; an amplifier connected to said loop antenna; an amplifier connected to said non-directional antenna; a common control for said amplifiers; a cathode ray tube having a first and second pair of deflecting plates; circuit connections from the output of said loop antenna amplifier to one pair of said deflecting plates; circuit connections from the output of said non-directional antenna amplifier to the other pair of said deflecting plates; means for translating the variations in amplitude of the received signals into directional indications on said tube of the direction to the transmitting station with respect to the plane of the loop free of directional ambiguities.

5. In a directional system; a loop antenna mounted on a moving vehicle and rotatable with respect to the direction to the transmitter station of the received signals as the direction of travel of the vehicle changes with respect to the direction to the transmitting station of the received signal for receiving signals varying in magnitude in accordance with the relation of the plane of the loop to the direction to the transmitting station; a non-directional antenna for receiving signals from the same station; a superheterodyne amplifier for each antenna; a cathode ray tube having a first and second pair of deflecting plates; circuit connections from the output of said loop antenna amplifier to one pair of said deflecting plates; circuit connections from the output of said non-directional antenna amplifier to the other pair of said deflecting plates for producing directional indications corresponding to the direction to the transmitting station with respect to the plane of the loop.

6. In a directional system; a loop antenna mounted on a moving vehicle and rotatable with respect to the direction to the transmitter station of the received signals as the direction of travel of the vehicle changes with respect to the direction to the transmitting station of the received signal for receiving signals varying in magnitude in accordance with the relation of the plane of the loop to the direction to the transmitting station; a non-directional antenna for receiving signals from the same station; a superheterodyne amplifier for each antenna; a common control for each amplifier; a cathode ray tube having a first and second pair of deflecting plates; circuit connections from the output of said loop antenna amplifier to one pair of said deflecting plates; circuit connections from the output of said non-directional antenna amplifier to the other pair of said deflecting plates for producing directional indications corresponding to the direction to the transmitting station with respect to the plane of the loop.

7. In a system for indicating the direction of a transmitter of radio signals, an indicator comprising a cathode ray tube having a first and second set of deflecting plates disposed in an angular relation; means for impressing signals of a predetermined intensity and corresponding to the radio signals upon said first set of deflecting plates for producing a null reference line indication comprising a non-directional antenna, a first amplifier, and circuit connections from said first amplifier to said first set of deflecting plates; a directional antenna for receiving said radio signals with an intensity varying in accordance with the angular position of said directional antenna with respect to the direction of said transmitter; means for impressing the directional signals upon said second set of deflecting plates for controlling the angular deflection of said indication from said reference in accordance with the angular deviation of said directional antenna with respect to said transmitter comprising a second amplifier, circuit connections from said second amplifier to said second set of deflecting plates, and means for varying the deflectional sensitivity of said indication; and a common tuning control for said amplifiers.

8. In a system for indicating the direction of a transmitter of radio signals, an indicator comprising a cathode ray tube having a first and second set of deflecting plates disposed in an angular relation, a fluorescent screen, and means for generating an electron beam; means for impressing signals of a predetermined intensity and corresponding to the radio signals upon said first set of deflecting plates for producing a null reference line indication on said screen comprising a non-directional antenna, a first amplifier, and circuit connections from said first amplifier to said first set of deflecting plates; a directional antenna for receiving said radio signals with an intensity varying in accordance with the angular position of said directional antenna with respect to the direction of said transmitter; means for impressing the directional signals upon said second set of deflecting plates for controlling the angular deflection of said indication from said reference in accordance with the angular deviation of said directional antenna with respect to said transmitter comprising a second amplifier, circuit connections from said second amplifier to said second set of deflecting plates, and means for varying the deflectional sensitivity of said indication; and means for controlling the time phase relation between said signals to bring them into substantial time phase relation to produce a substantially straight line indication on said screen comprising a variable condenser.

9. In a system for indicating the direction of a transmitter of radio signals, an indicator comprising a cathode ray tube having a first and second set of deflecting plates disposed in an angular relation, a fluorescent screen, and means for generating an electron beam; means for impressing signals of a predetermined intensity and corresponding to the radio signals upon said first set of deflecting plates for producing a null reference line indication on said screen comprising a non-directional antenna, a first amplifier, and circuit connections from said first amplifier to said first set of deflecting plates; a directional antenna for receiving said radio signals with an intensity varying in accordance with the angular position of said directional antenna with respect to the direction of said transmitter; means for impressing the directional signals upon said second set of deflecting plates for controlling the angular deflection of said indication from said reference in accordance with the angular deviation of said directional antenna with respect to said transmitter comprising a second amplifier, a variable condenser for tuning said directional antenna, circuit connections from said second amplifier to said second set of deflecting plates, and means for varying the deflectional sensitivity of said indication; means for controlling the time phase relation between said signals to produce a substantially straight line indication on said screen comprising a manually operable vernier condenser connected in parallel across said variable condenser.

EDWARD J. HEFELE.